B. L. DAVIS.
VEHICLE.
APPLICATION FILED AUG. 28, 1913.
1,154,616.
Patented Sept. 28, 1915.
2 SHEETS—SHEET 1.
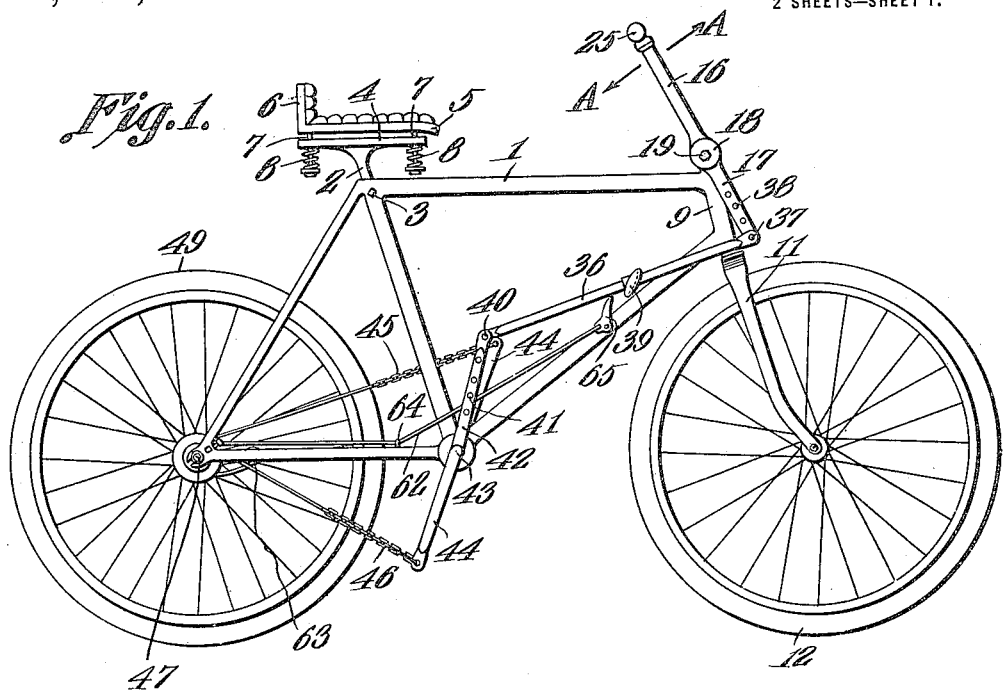
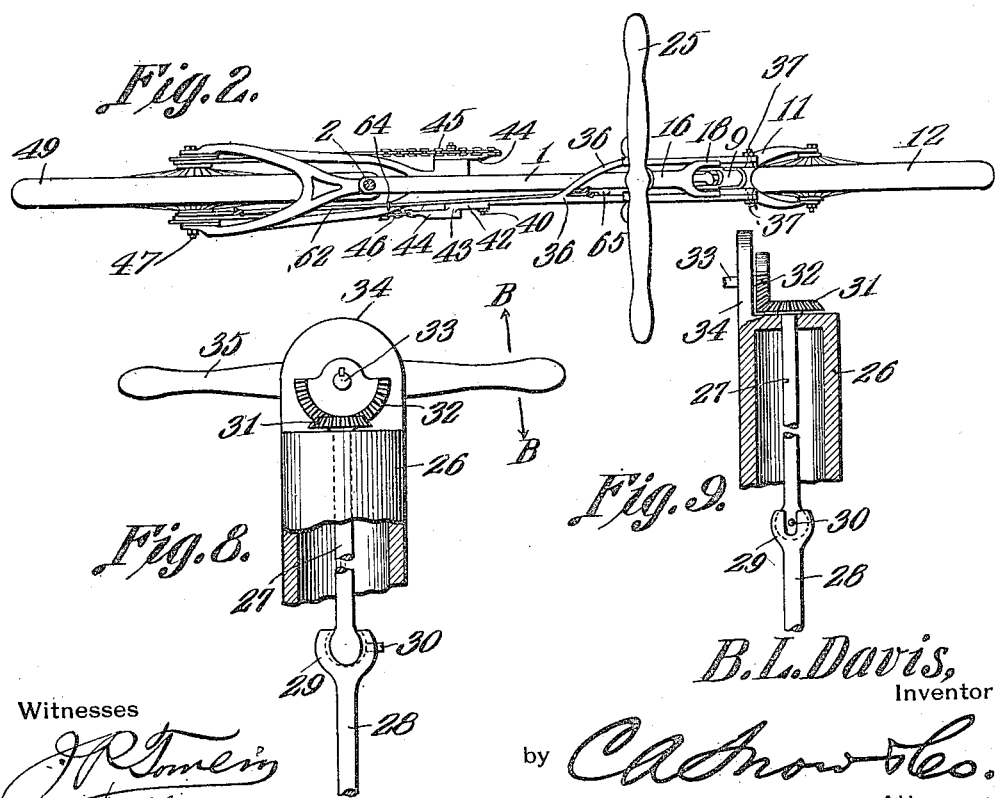
Witnesses
B. L. Davis,
Inventor
by
Attorneys

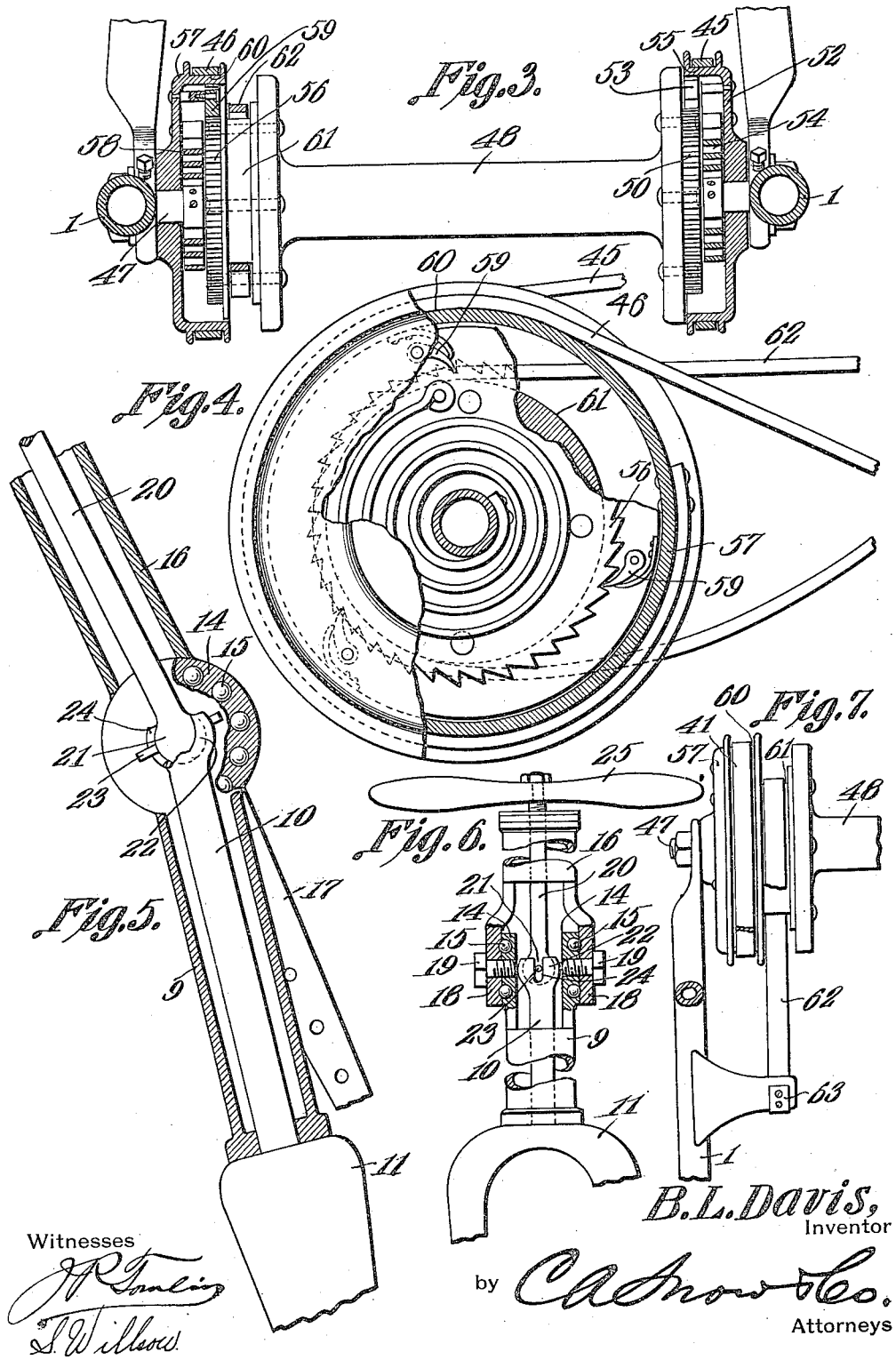

UNITED STATES PATENT OFFICE.

BERT L. DAVIS, OF WICHITA, KANSAS.

VEHICLE.

1,154,616.   Specification of Letters Patent.   Patented Sept. 28, 1915.

Application filed August 28, 1913. Serial No. 787,183.

*To all whom it may concern:*

Be it known that I, BERT L. DAVIS, a citizen of the United States, residing at Wichita, in the county of Sedgwick and State of Kansas, have invented a new and useful Vehicle, of which the following is a specification.

The device forming the subject matter of this application is a novel means for propelling a vehicle. The vehicle has been shown in the form of a bicycle, but, obviously, any number of ground wheels may be provided.

One object of the invention is to provide a simple structure, adapted to be operated by the hands of the user, to propel the vehicle and steer the vehicle.

Another object of the invention is to provide novel means for operatively connecting the actuating mechanism with the rear wheel of the structure.

With the above and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the drawings: Figure 1 is a side elevation; Fig. 2 is a top plan, parts being omitted; Fig. 3 is a transverse section through the rear hub, parts appearing in elevation; Fig. 4 is a sectional elevation of one of the ratchet mechanisms; Fig. 5 is a sectional detail of the combined propelling and steering mechanism; Fig. 6 is a front elevation of the structure shown in Fig. 5, parts being sectioned; Fig. 7 is a fragmental plan showing one end of the hub and adjacent parts; Fig. 8 is a sectional elevation showing a slightly modified means for connecting the handle operatively with the remaining portions of the steering and propelling mechanism; Fig. 9 is a sectional detail of the structure shown in Fig. 8.

In carrying out the invention there is provided a frame 1 which may be of any desired form, depending upon the number of ground wheels employed. In the present instance, although not necessarily, the structure has been employed on the frame of a bicycle. Slidable in the frame 1 is a seat post 2 held in place by a set screw 3 and supporting a platform 4. Disposed above the platform 4 is a seat 5 comprising a back 6. Standards 7 are secured to the seat 5 and are vertically slidable in the platform 4. Springs 8 surround the standards 7, the upper ends of the springs 8 being secured to the platform 4 and the lower ends of the springs being secured to the standards 7 so as to support the seat 5 yieldingly. When the nature of the invention is better understood, it will be obvious that the back 6 affords a brace, permitting the operator to exercise the necessary effort upon portions of the actuating or propelling portion of the mechanism. The forward frame 1 is provided with an upright socket 9 within which is rotatable a shaft 10 provided at its lower end with forks 11, supporting for rotation the forward wheel 12. At its upper end, the socket 9 is provided with bearings 14 having, in their outer faces, circular ball races receiving balls 15. A lever 16 is provided, the same terminating at its lower end in extensions 17. In its intermediate portion, the lever comprising the parts 16 and 17 is provided with bearings 18, overlapping the bearings 14 of the socket 9, and engaging the balls 15. Pivot elements 19 connect the bearings 18 and 14, so that the lever 16—17 is free to swing, as indicated by the arrows A in Fig. 1, in a common plane with the forward wheel 12.

Mounted to rotate within the tubular lever 16 is a shaft 20 provided at its lower end with a ball 21, received in a socket 22 formed at the upper end of the shaft 10. The ball 21 is equipped with outstanding pins 23 or other projections received in upright slots 24 formed in the socket 22. The ball and socket joint 21—22 is concentric with the hinge union afforded by the pivotal elements 19. Secured to the upper end of the shaft 20 is a transverse, horizontally disposed handle 25.

From the foregoing it will be obvious that, through the medium of the handle 25, rotatory movement may be imparted to the shaft 20, rotatory movement being transmitted from the shaft 20 to the shaft 10, the fork 11 and the forward wheel 12 through the pin and slot connection 23—24 constituting a part of the ball and socket joint 21—22. Thus, the vehicle may be steered. At the same time, the hinged joint afforded by the pivot elements 19 will permit the lever 16—17 to be tilted a plane coinciding with the plane of the wheel 12, and when the lever 16—17 is thus tilted, as indicated by the arrows A in Fig. 1, motion will be transmitted from the steering and propelling handle 25 to a driving mechanism which will be described hereinafter.

In Figs. 8 and 9, a modified means is shown for steering the vehicle. Referring to Figs. 8 and 9, a tubular lever 26 is shown, the same corresponding to the lever 16 hereinbefore described. The shaft 27 exercises the same functions as the shaft 20 and the shaft 28 corresponds to the shaft 10, the ball and socket joint being shown at 29 and the same being provided with the pin and slot connection 30. Secured to the upper end of the shaft 27 is a beveled pinion 31, meshing into a beveled pinion 32, keyed to a shaft 33, journaled for rotation in an extension 34 formed at the upper end of the tubular lever 26. A transverse handle 35 is secured to the rear end of the shaft 33, the handle 35 corresponding to the handle 25.

From the foregoing description relative to Figs. 8 and 9, it will be obvious that the tubular lever 26 may be swung in the direction of the arrows A in Fig. 1, through the medium of the handle 35, thereby to effect the propelling of the vehicle. In order to effect a steering of the vehicle, the handle 35 is tilted with the shaft 33 as a center in an approximately vertical plane, and in the direction of the arrows B in Fig. 8. When this operation is carried out, the shaft 33 will be rotated, and the beveled pinion 32 meshing into the beveled pinion 31 will actuate the shaft 27, the same, through the pin and slot connection 30, imparting the rotatory movement to the shaft 28, the latter actuating the forks 11 and the wheel 12, to effect a steering of the vehicle. Obviously, the ball and socket joint 29 permits the shafts 27 and 29 to have the necessary knuckling movement, when the tubular lever 26 is swung to and fro, in the direction of the arrows A in Fig. 1 to effect a propelling of the vehicle.

Passing now to the mechanism whereby when the tubular lever 16 is tilted in the direction of the arrows A in Fig. 1, motion is transmitted to the rear wheel 49, it will be noted that the invention includes a bifurcated pitman 36, carrying at its forward end a pivot element 37, adapted to be engaged in any one of a series of openings 38 formed in the extensions 17 of the lever 16. The construction last above outlined permits the throw to be altered at will. The rear end of the pitman 36 carries a pivot element 40, adapted to be engaged in any one of a series of openings 41 formed in an upstanding arm 42 secured to one end of a crank shaft 43, journaled in the usual location in the lower portion of the frame 1.

From the foregoing, it will be seen that motion may be transmitted to the crank shaft 43 from the handle 25. If desired, the pitman 36 may be provided with pedals 39, so that the operator may actuate the structure, not only manually, but by leg-motion as well. Secured to opposite ends of the crank shaft 43 are oppositely extended arms 44. To the extremity of one arm 44 is attached a flexible element 45 and to the extremity of the other arm 44 is attached a flexible element 46. Held in the usual manner in the rear, lower portion of the frame 1 is a shaft 47 upon which is journaled for rotation a hub 48 constituting a part of the rear wheel 49. To one end of the hub 48 is secured a ratchet wheel 50. Journaled on the shaft 47 and overhanging the ratchet wheel 50 is a drum 52 provided with pawls 53 adapted to engage the ratchet wheel. A spiral spring 54 surrounds one end of the shaft 47, one end of the spring 54 being secured to the shaft, and the other end of the spring being secured to the rotatable drum 52. The drum 52 is provided with a grooved tread 55, receiving the flexible element 45, one end of the flexible element 45 being secured to the periphery of the drum 52. A ratchet wheel 56 is secured to the other end of the hub 48 and a drum 57 is journaled on the corresponding end of the shaft 47. The drum 57 carries pivotally mounted pawls 59, adapted to engage the ratchet wheel 56. A spring 58 is coiled around the corresponding end of the shaft 47, one end of the spring being secured to the drum 57 and the other end of the spring being secured to the shaft. The drum 57 is provided with a grooved tread 60, receiving the flexible element 46, the rear end of the flexible element being secured to the periphery of the drum. The ratchet wheel 56 is provided with a groove neck 61 which lies adjacent the corresponding end of the hub, the neck 61 being adapted to receive a brake strap 62, one end of which is secured as indicated at 63 to the frame 1, the brake strap 62 being passed through an eye or roller 64 upon the lower portion of the frame 1, and the forward end of the brake strap being connected to a pedal 65 pivoted upon the frame 1, as will be clearly understood from Fig. 1.

In practical operation, the lever 16—17 is tilted on its fulcrum and motion is thus transmitted to the pitman 36, the pitman 36 actuating the arm 42 and the latter rotating the crank shaft 43, motion being thus transmitted to the arms 44. When one arm 44 is moved forwardly, the flexible element 45 will be drawn upon, the same rotating the drum 52, the pawls 53 of which, engaging the ratchet wheel 50 will impart rotary movement to the hub 48 and to the rear wheel 49. During this operation, the coiled spring 54 will be put under tension and so soon as the pull upon the flexible element 45 is released, the spring will rotate the drum 62 rearwardly, permitting the pawls 53 to secure a new hold upon the ratchet wheel 50. From the crank shaft 43 and the other arm 44, motion is transmitted to the flexible element 46, the same actuating the drum 57, the pawl 59, the ratchet wheel 56, the hub 48 and the wheel 49. When the upper end of one arm 44 is moving forwardly, the lower end of the other arm 44 is moving rearwardly, and thus, through the flexible elements 45 and 46 and the connected mechanisms, a practically continuous rotary movement will be imparted to the hub 48 and to the rear wheel 49. Brake pressure may be applied through the medium of the pedal 65, the same actuating the strap 62, the latter being tightened around the neck 61 which constitutes a part of the ratchet wheel 56, this latter element being secured to one end of the hub 48. At any time, the shaft 20 may be rotated through the medium of the handle 25 and, through the pin and slot connection 23—24 in the ball and socket joint 21—22, rotary movement will be imparted to the shaft 10, the forks 11 and the forward wheel 12 to effect a steering of the vehicle. As hereinbefore stated, the ball and socket joint 21—22 is located concentric with the pivot elements 19, and consequently, the steering operation may take place simultaneously with the propelling operation afforded by the tilting of the lever 16—17.

The structure shown in Figs. 8 and 9 has been described hereinbefore, but it may be stated briefly at this place that a vertical tilting movement of the handle 35 with the shaft 33 as a center serves to rotate the shaft 28 and effect a steering of the vehicle, through the medium of the intersecting beveled pinions 31 and 32, the shaft 27 and the pin and slot connection 30 in the ball and socket joint 29.

Having thus described the invention, what is claimed is:—

1. In a vehicle of the class described, a frame; a lever mounted on the frame; a ground wheel journaled on the frame; means for connecting the lever with the ground wheel to impart propelling motion to the ground wheel; a multi-part flexible shaft journaled partly in the frame and partly in the lever; a steering wheel carried by one member of the multi-part shaft; a handle mounted to tilt on the lever; and means for operatively connecting the handle with the other member of the multi-part shaft to impart rotation to the multi-part shaft and to effect a shifting of the steering wheel.

2. In a vehicle of the class described, a frame; a lever mounted on the frame; a ground wheel journaled on the frame; means for connecting the lever with the ground wheel to impart propelling motion to the ground wheel; a multi-part flexible shaft journaled partly in the frame and partly in the lever; and a steering wheel carried by one member of the multi-part shaft.

3. In a vehicle of the class described, a frame; a lever fulcrumed on the frame; a shaft comprising coöperating members, one of which members is journaled on the frame, the other of which members is journaled in the lever; a hinge joint uniting the members of the shaft and concentric with the fulcrum of the lever; a steering wheel operatively connected with the frame-carried member of the shaft; a ground wheel carried by the frame; and means for connecting the ground wheel with the lever.

In testimony that I claim the foregoing as my own, I have hereto affixed my signature in the presence of two witnesses.

BERT L. DAVIS.

Witnesses:
 ISIDOR LESERN,
 E. E. BLECKERY.

Copies of this patent may be obtained for five cents each, by addressing the "Commissioner of Patents, Washington, D. C."